Aug. 28, 1928.
M. F. HILL
1,682,564
COMPRESSOR
Filed Feb. 15, 1923
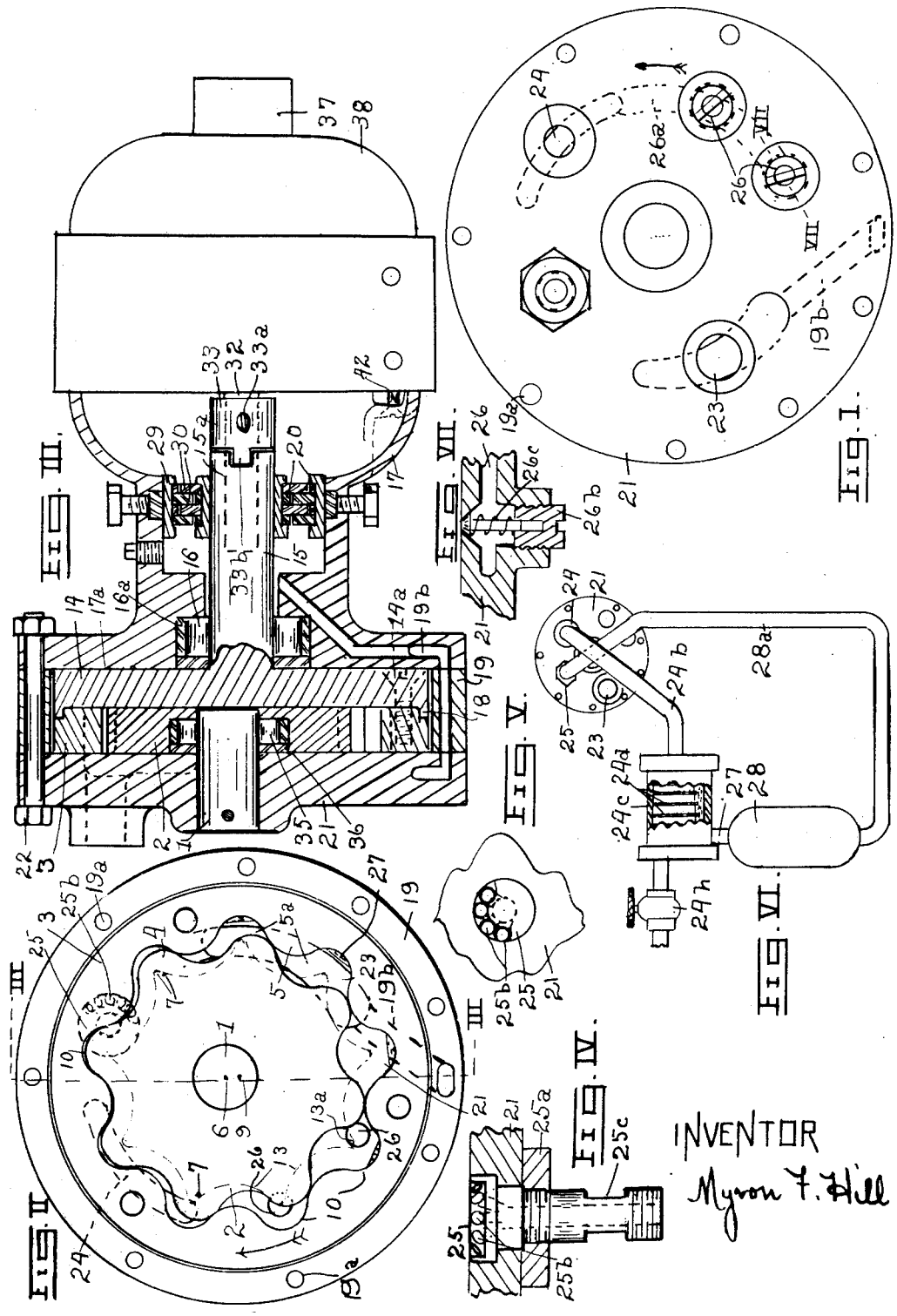
INVENTOR
Myron F. Hill Patented Aug. 28, 1928.

1,682,564

UNITED STATES PATENT OFFICE.

MYRON F. HILL, OF NEW YORK, N. Y.

COMPRESSOR.

Application filed February 15, 1923. Serial No. 619,292.

My invention relates to constructions including fluid passageways and rotors for operation in connection with fluids having travelling contacts between the contours to prevent leakage from one passageway to the other to make possible high pressures and high volumetric efficiency at any pressure.

These results are attained by the employment in such a mechanism of two rotors or gears, one within and eccentric to the other and having tooth divisions differing in number by one, the contour of each rotor outlined or generated by the tooth form of the other as they rotate with each other at regular angular motions that are at speeds determined by the numbers of tooth divisions to provide tooth spaces or chambers separated by travelling tooth contacts for performing pressure functions.

In other words the contours have geometrical outlines produced by three elements, namely two rolling circles and a master curve, assisted by a fourth derivative element, a mating curve.

Let two circles be located upon a plane, one within the other and tangent to it. Let their diameters be in proportion to the numbers of tooth divisions selected for the two rotors which should differ by one. A master curve to represent the desired tooth form of a rotor (either rotor) is selected to start curve generation with and located upon the radius of the circle representing that rotor whose tooth form is so selected.

If the master curve is located upon the radius of the inner circle it should have convexity upon its outer side and if located upon the radius of the outer circle it should have convexity upon its inner side. One circle is then rolled with the other without slip at the point of tangency which results in steady angular motion of one with relation to the other determined by their relative diameters or in the inverse ratio of the numbers of tooth divisions, and the curved form traced in all the successive positions which it assumes with relation to the other circle, and a curve then drawn along the crests of the traced curves as a curve of envelopment which is the contour that is sought for one rotor element. A portion of this contour, which may be called the mating curve is then carried by the radius of the other circle, as the rolling action is continued in the same way, and its form in every successive position with relation to the first circle is traced; and a curve of envelopment is drawn along the crests of the curves so traced. This latter curve is the contour of the other rotor element.

Applying this description now to the specific embodiment of my invention, the master curve selected is a smaller circle, or a portion of its periphery, representing the addendum or convex crown of a tooth of the inner rotor. It is located upon the radius of the inner rolling circle with the center of the arc on or outside of the periphery, depending upon its size and shape. The two circles with the radius of the inner circle carrying this master curve, are then rolled, one with the other and the position of this arc traced in each successive position which it assumes with relation to the other circle. This inner circle may rotate nine times while the outer circle rotates eight times or at speeds inversely proportional to the numbers of teeth selected. This relative speed not being varied has a steady angular motion. The contour or outline of the nine tooth rotor, the outer rotor, is the curve of envelopment traced along the crests of these traced curves.

A portion of this curve, having a convex side toward the center of the rolling circle is then the "mating curve". It comprises the entire convex portion of a tooth division. It is located upon the radius of the outer circle in its outlined or generated position and the two rolling circles again rolled in the same way and the mating curve is traced in all its successive positions with relation to the inner circle. If the outer circle rotates eight times the inner circle rotates nine times, thus rotating at speeds inversely proportional to the numbers of tooth divisions of the two rotors. A curve of envelopment is then drawn thru the crests of these traced curves which is the contour or outline of the inner rotor element. Such rotors cooperate in the manner specified.

A convenient method of laying out these curves is to mount the describing curve—either the master curve or the mating curve—upon an arm which is swung around the center of the circle to which it belongs and rotate a blank around the center of the other circle and trace upon the blank the describing curve in all the successive positons which it assumes, the arm and the blank rotating upon their centers at speeds inversely proportional to the numbers of tooth divisions of the rotors.

Instead of rolling both circles, one circle may remain stationary and the other rolled in or on it as the case may be, always maintaining the point of tangency without slip. This is equivalent to mounting the circles upon a plane rotating backward as fast as one of the circles rolls forward, thus neutralizing its motion. Nevertheless with relation to such a plane their speeds still vary in inverse ratio, or inversely proportional to the numbers of tooth divisions of the rotor elements.

In the mechanical operation of making rotors, the two rolling circles mentioned are the base or pitch circles of the actual rotors which vary in diameter in proportion to the numbers of tooth divisions. The master curve selected is the form of a milling cutter having cutting teeth upon its outer diameter. The mating curve has the characteristic of the convex portion of the tooth of the outer rotor, and its generated position on the base circle. The two base circles and the master milling cutter determine the contour of the outer rotor and therefore of the mating curve. That is, the mating curve is determined from those three elements.

A blank for the outer rotor is selected with a hole in it to clear the tooth positions, so that there is material from which to form the teeth. It may be mounted in a milling machine in which the milling cutter is carried upon a fixed axis,—which corresponds to holding the inner base circle in a fixed position, as above described. The mechanic is supplied with figures to shift the table vertically and horizontally between cuts so that with relation to the blank the milling cutter follows the successive positions of a tooth of the inner rotor. When both circles rotate the axis of the milling cutter rotates around the pinion axis as the blank rotates around the other axis. But when the inner circle is fixed the pinion axis is also fixed and the blank rotates on its axis and the axis of the blank rotates around the pinion axis. In either case the resulting curve is the same as hereinbefore described. If the rotors are of the size shown in the drawings, twenty successive cuts from the top of a tooth to the botom of the next tooth space, repeated for all the other teeth and tooth spaces; and twenty cuts from this bottom position of a tooth space to the top of the next tooth similiarly repeated will form the contour of the outer rotor. The surfaces have minute serrations which are removed by wearing the rotor into its mate.

The mating rotor, the pinion, is then to be formed. A shaping cutter or "mating" tool is then made having the contour of the convex portion of the tooth form of the outer rotor and mounted in a so called "shaper", and a blank slightly larger than the outside diameter of the pinion or inner rotor is mounted on the table of the shaper. The mechanic is supplied with figures for rotating the blank by means of an index, and figures for setting the table in a series of horizontal and vertical positions and in each position the mating tool cuts the blank. Such positions are the positions of the tooth form of the outer rotor with relation to the contour of the inner rotor. Twenty such positions from the top of a tooth of the inner rotor to the bottom of the next tooth space and twenty more from that point to the top of the next tooth, repeated for all teeth and tooth spaces, provide the contour or outline of the inner rotor. This method corresponds to the geometrical description above noted in which the inner circle is held stationary and the outer circle rolled upon it without slip at the point of tangency.

The tables of the machine employed for generation as in a milling machine or shaper are supplied with micrometer divisions on the screws that adjust them, so that accurate settings are possible. A milling machine may be used for the master tool and a shaper for the mating tool.

It is apparent to a mechanic that rotors so made fit so tightly one within the other that rotation is difficult, and one rotor has been worn into the other by an operation which may be called "burnishing" which wears off the minute serrations between the cuts so that the rotors work freely together and maintain the contacts between their contours in the region of tangency of the base circles which is usually (in gear parlance) termed "full mesh"; and in the region opposite where the base circles are farthest apart usually termed "open mesh"; which are utilized in fluid mechanisms to keep the pressure in one passageway from leaking through the teeth over into the other passageway. In both full mesh and open mesh regions this contact is travelling and continuous during rotation so that as the teeth shift in their relative positions with each other and the tooth spaces they do not recede from each other at points which would permit a substantial dissipation of pressure from a high pressure passageway over into a low pressure passageway. My contours with their steady angular velocities maintain fluid tightness in these regions so that high mechanical and volumetric efficiencies are made possible.

Whatever the master curve, and whatever the contour system it creates, this continuous travelling fluid tight relation between the ports both at full mesh and open mesh regions is maintained, tho the port locations shown apply specifically to the specific type of contour shown in which the master curve is circular, and represents a tooth form of the inner rotor.

If the diameter of the milling cutter is $\tfrac{1}{8}$ (of any unit of measurement) its center should lie .023, more or less, outside of the base or pitch circle, when there are eight tooth divisions of the form shown on the inner rotor, and nine tooth divisions on the outer rotor. The base or pitch circles vary as eight to nine, the inner circle having a radius of eight units, and the outer a radius of nine units. Their diameters being sixteen and eighteen units respectively, which is proportional to the numbers of tooth divisions selected for the rotors.

When one rotor is "burnished" into the other as described, it is apparent that a tooth of one rotor makes such a close engagement with the contour of the tooth space of the other rotor in the full mesh region that the travelling engagement substantially preventing leakage is realized, and with the ports in the position shown there is always at least one point of contact or engagement of the nature specified between the rotor contours substantially preventing leakage in this region.

If the master form or milling cutter represents the tooth of the outer rotor and a mating curve represents the tooth form of the inner rotor, the inner rotor is of course generated first by the master form, and then the mating tool is also generated so that it has the form of a tooth of the inner rotor and this mating tool then generates the outer rotor by the same method described above.

The two rotors have teeth theoretically always in mesh except where a tooth of one rotor at full mesh leaves one tooth of the other rotor in passing to the next tooth of that rotor.

My preferable specific means in this application is connecting the driven shaft to the outer member of the mechanical movement, that is, to the outer rotor, so that the teeth on the outer rotor approach into such intimate relation to those of the inner rotor during pressure functions (as the rotor chambers close in an air compressor to compress air, or as the teeth of rotors pass each other at open mesh between the fluid ports) that the fluid relation at these points is attained. As these surfaces may be subject to wear under the driving pressure, and friction of the teeth, one upon the other, mechanical pressure and friction are substantially eliminated except in the region of full mesh where the driving contact is almost a rolling character, and where the real driving action finally takes effect. Elsewhere the teeth slide lightly on each other, but in tight contact where fluid tightness is needed. This wearing process wears the rotors tight, not loose.

If my rotors are supplied with air or steam or other fluid pressure from one of its ports (the discharge port in an air compressor construction for example) it becomes a motor or prime mover. And the electric motor may become thus an electric generator. Other devices may be substituted for the electric motor, directly or indirectly connected to the rotors.

There are different ways of applying the driving connection but is should be so applied as not to destroy this relation, unless other means are used to accomplish the same result. The coaxial relation shown is efficient as a driving relation.

This construction with tight fitting side walls, is capable, even when dry, and if run at high enough speed, to develop pressure of useful proportions.

For general purposes however, I prefer a "liquid seal" so called.

I am not the first to invent a liquid seal. But a liquid seal alone has been inadequate to develop high pressure or prevent leakage of serious proportions over the ends of the retorts. Combined with my mechanical contact between the teeth, however, it provides wonderfully efficient conditions for putting to use elastic fluid pressure, or for developing them. If in fact the tooth contacts between the teeth, to start with, are scarcely an actual contact finally the construction shown settles down to a light contact on the pressure side of the center line, through the rotor axes, where the rotors are to be air tight and an almost rolling driving contact at full mesh, after the high points on both members have been worn off by rubbing contact.

The liquid seal, when supplied in sufficient volume to afford efficient action, is preferably also distributed through air or gas in the form of mist. For motor work, it should be removed from the exhaust by means of a separator so that it may be used over again. For an air compressor it is of particular value, as it absorbs heat of compression. When air at 32 degrees F. is compressed to 100 lbs., its theoretical temperature rises to 485 degrees F. At higher pressures the temperature is even higher. But the liquid mist, distributed evenly thru the air forming a veritable fog absorbs a large proportion of this heat so that the temperature of the discharge is not so very much higher than that of the intake. As the creation of heat absorbs power, the compression of air without developing heat results in an economy of power. And the liquid seal thereby acquires new value. It should however, be provided in such quantities as not to be used again while warm. Unless collected again from the discharged air or gas its expense might be so great as to prevent its use. Moreover air and gas charged with oil is so objectionable for most uses as to be fatal to commercial adaptation of the pump. My invention therefore, includes means to remove the oil, mist or fog from the discharged air or gas, whether it issues at high pressure (as in a compressor) or at low pressure (as in a steam engine). I provide means to divide the discharged air or gas into a multiplicity of tiny streams each directed against a surface adapted to receive the oil touching it and hold it or guide it to an oil discharge port, vent, or reservoir.

The separator for an air compressor is preferably operated under the high discharge pressure, and the oil (or other liquid seal) used, piped directly to an oil port in the mechanical movement to provide the oil seal and oil cooling features hereinbefore described.

Separators are commonly used with the ordinary compressors in commercial use. In such compressors oil is not used for cooling and no such volume of liquid is used. As lubricating oil in ordinary compressors may be heated to the vaporizing point, oil and air are cooled before entering the separator to condense the vapor. But in my system there is no such heat or vapor, and preliminary cooling is not necessary for efficient separation.

There are different ways somewhat effective of supplying the oil seal. Oil may be caused to enter the intake passageway and thus pumped by the pump to the high pressure discharge port. Or it may be delivered by ports to the mechanical movement at various points, its flow regulated by a valve 24¹ in the piping or by having it measured by the rotor chambers as hereinafter referred to.

It may be regulated to supply enough oil to keep the temperature of compression down to a very low point or in such small amounts as to cool very little.

In my system the oil is used preferably in such volume as to prevent the high vaporing temperature usually attained. No intercooling is necessary and the air and oil free of vapor may enter the separator directly and be efficiently separated.

A separator is understood to be a device which brings the oil into contact with, or under the influence of, means to remove it from the air.

Such a separator and a liquid seal accomplish results heretofore not attained and assume new cooperative relations.

One of the objects of this invention is the simplification of compressor movements and reduction in weight of compressor equipments for such use as in airbrakes, tire pumps, vacuum pumps, refrigerating units, air liquefaction and others too numerous to mention, but including gas compression in general.

My new mechanical rotory movement comprises two rotors, a pinion rotor working inside and geared with an outer annular or ring rotor. The pinion preferably has one less tooth division than the annular, and all pinion teeth may be theoretically in contact with the annular contour at all times, and in practice in contact where chambers must be tight, with enough lost motion elsewhere to work freely.

The pinion is eccentric to the annular and together they open and close chambers between them as they rotate on eccentric axes. On one side of the center line thru the axes or from full mesh to open mesh the chambers increase in volumetric capacity and on the other side from open mesh to full mesh they decrease. On the latter side they may compress air or gas into a storage chamber and on the former side they may receive air from some source at a low pressure—such as the atmosphere.

A driving or power shaft may be connected to drive either rotor. Means to maintain contact during compression are essential to efficient gas compression. If the annular rotor is driven directly under conditions to be set forth, the compressor works efficiently.

Fig. I is a front elevation of the cover plate shown in Fig. III.

Fig. II is an inside view of cover plate with rotors in position.

Fig. III is a section view of the assembled compressor on a line Fig. II thru the axes.

Fig. IV is a detail of an adjustable oil port or valve.

Fig. V is an end view of the oil port as seen when looking at the inside face of the cover plate.

Fig. VI is a diagrammatic view of the compressor showing the system, with the air discharge and oil conduits, and oil separator.

Fig. VII shows a check valve on section line VII—VII, Fig. I.

On the fixed eccentric shaft 1 (Figs. II and III) is journaled the pinion 2. The pinion rotor is meshed with the annular rotor 3, so that the pinion lobes 4 engage the annular lobes 5 in theory at all times, separating the chambers 5ª from each other.

In Figure II the pinion lobes 7 have substantially circular faces. The faces of the lobes 5 and the concave curves 10 are generated as hereinbefore described.

In this figure, the centers 6 and 9 may be established at a distance from each other of .115. The radius of the pitch circle of the pinion may be eight times .115 or .92 and of the annular nine times .115 or 1.035. The axis of the pinion lobe may be located from .023 to .045 or more outside of the pitch circle of the pinion. The radius of a pinion lobe 4 (and of the milling cutter) may be .21875. The axis of a tooth 4 and of the milling cutter preferably describes a star shaped figure of the general character of the phydocroid curve 13. A curve 5—10 results. I do not limit my invention to these dimensions for any rotor curves that have a sufficiently continuous co-acting relation with a good driving contact will answer. Portions of the curves may be cut away for various purposes where not necessary for fluid tight or pressure functions. Many of the combinations claimed in this case are not limited to the specific forms or systems of curves described.

When the axis of the cutter is sufficiently outside of the true pinion pitch or base circle and carried upon a radius of one of them, the figure 13 described by the cutter axis has points 13ª of a somewhat oblate nature. This provides curves in the annular rotor which, when well worn and lubricated, run freely.

If the point of the star shaped figure 13 has a curve at 13ª with any of its changing radii less than one half the radius of the milling cutter, the resulting curve is inferior for most purposes.

The rotor contours may be applied in inverse to tools and appliances to be employed in the manufacture of rotors in quantities.

The rotors are preferably ground flat on both sides in unison to the same thickness.

The back plate 14 is also flat and is fixedly connected to the driving shaft 15 which may be mounted in a roller bearing 16 running in a bushing 16ª in the back plate of the casing (or end bracket of the motor) 17 (Fig. III). The annular rotor 3 may be centered upon the driving plate 14 by the shoulder 18 (Fig. III) of the latter. The annular rotor may be pinned to this driving plate by dowels and fastened by screws 14ª. (Fig. III.)

The pinion is preferably journalled upon the shaft 1 located in the front part or cover plate 21 of the pump casing. It may be held there by a driving fit. The center of this shaft is eccentric to the shaft 15, as indicated by the centers 6 and 9 in Figure II. Between the cover plate 21 and the back part of the pump casing 17ª may be an annular ring 19 (Fig. III) outside of and not touching the annular rotor to allow its free rotation. The ring 19 is the same in thickness as the combined annular rotor and driving plate plus clearance of one or two thousandths of an inch. The cover plate, the ring, and the back plate of the pump casing may be centered by the rotors and fastened in their proper relative positions by the dowels or bolts 22 (Fig. III) which have a close fit through corresponding holes 19ª in the cover plate, the ring, and the casing. The clearance above mentioned allows a thin film of the sealing fluid—such as oil—to cling to both faces of the pinion, between the annular rotor and the cover plate, and between the casing at 17ª and the back of the driving plate to be used for sealing purposes and prevent leakage at these points, as the pressure in the pump subjects the surface of the casing 17ª to high pressure, and keeps it tight. In practice it has been found that with ordinary lubricating oil as a seal this clearance may increase to several thousandths of an inch without affecting seriously the efficiency of the pump movement owing to the air or fluid pressure gathering behind the driving plate and pressing the rotors against the port plate. No wear on the sides of the rotors has been found over long periods of time of running at high compression pressures.

As noted the ring 19 provides a clearance between the driving plate 14 and the back casing wall 17ª of a very few thousandths of an inch. If this clearance is substantially increased,—enough to permit the rotors to be pushed back from the port plate 21 by the pressure that is initiated in rotor chambers to such a point that thereafter no pressure is confined in the chambers but escapes over their front ends, of course the compressor will fail to compress. The close tolerances specified between the front port plate 21 and the back wall 17ª prevent such a result by maintaining film pressures along the port plate which are communicated to the space between the driving plate 14 and the back wall 17ª thereafter thrusting the rotors against the port plate to maintain a tight joint which is maintained in spite of wear between them. The walls 21 and 17ª are of course unyielding or fixed.

The front cover plate is provided with an intake port 23, a discharge port 24, and an oil port 25, and two or more check valves 26 (Figs. I and VI) which discharge oil or air or both under different conditions. The intake port extends to the point (or slightly beyond) where the rotor chambers having reached their maximum size, beginning to contact are cut off from it, so that the compressed fluid may enter at low pressure and large volume. The air or gas is then carried around in the respective chambers by a clockwise rotation of the rotors (Fg. II) to discharge port 24 where it is discharged at higher pressure and smaller volume, with the sealing fluid as hereinafter described.

The sealing fluid, which may be oil (or other liquid which works satisfactorily with the elastic pressure fluids used) may enter the rotor chambers where they begin to enlarge at a point just beyond full mesh, about the position shown by the oil port 25 in Figure II. The chambers as they start to open fill with oil until they pass beyond the oil port, so that a "cut-off" of the oil port is effected. The positions of the oil port thus vary the quantity of oil measured off by the rotor chambers. Of the oil in the chambers, a part is thrown outward by centrifugal force and gathers in pools indicated at 27 in each chamber and part is sprayed and churned into a mist which, mixing with the entering air or gas, forms a fog. As shown in Fig. II, the outer edge of the intake port is located just inside of the outer edge of the rotor chambers to prevent the pools of oil from being thrown out into the low pressure passageway. At the point of full mesh each pool of oil is forced over the faces of the rotors helping to maintain an oil film on the sides of the rotors and between the teeth for sealing purposes.

The oil port or valve is shown in detail in Fig. IV. The holes 25$^b$ may or may not, according to adjustment, connect directly to the opening chambers as they pass by. In Fig. II the oil valve is shown in the position where the chambers in sweeping by, receive the maximum amount of oil. This position facilitates high speeds—say between three and four thousand r. p. m. By loosening the holding nut 25$^a$ (Fig. IV) and applying a wrench at 25$^c$ the plug or port may be rotated so that no part of the port connects with the chambers directly but only allows oil to enter against the side of the pinion. The latter position has been found suitable for oil seals of the thinnest kind for low speeds and pressures. The amount of oil or sealing fluid used for a lubricant, for sealing, and for cooling may be thus regulated to suit any desired condition. After leaving the discharge port the air and oil may enter any suitable "oil separator" from which the air may go to a storage chamber and oil return to the oil port under the same pressure as the compressed gas.

If while the pump is quiet the chambers fill with the sealing fluid due to the pressure behind the oil it may escape when the motor starts, through the check valves 26 as hereinafter described shown in Figures I and II, which may be connected to the regular discharge port by a passage way 26$^a$ as indicated. As the rotors begin to rotate such oil is forced bodily out of those chambers not yet connected to the regular discharge port, and into the discharge passageway described. When starting at low pressure air is also discharged thru the check valves. If the head pressure is low enough this action is continuous.

A stuffing box 29 filled with a heavy grease prevented from escaping by interleaved packing rings 30 may be provided to prevent any slight leakage of compressed air or gas and sealing liquid which might otherwise occur. The passageway 19$^b$ from the intake port 23 to the region between the roller bearing 16 and the stuffing box 30 may or may not be used. It formed no part of the compressor as originally constructed and operated.

Of the packing rings, alternate ones are lightly mounted in the housing and on the collar of the shaft respectively, those of each series being separated by spacing rings 20 slightly thicker than the packing rings.

The driving shaft 15 may have a hole 15$^a$ bored to fit and to receive the end of the motor shaft 32, the latter having preferably a driving fit in the former. Positive drive is maintained by the clutch 33 held by the set screw 33$^a$ having a rib 33$^b$ fitting into the slot 34 in the shaft 15.

The back casing 17 replaces the driving end or bracket or shield of the motor and may be held in place on the motor frame by screws 42 as shown. The other end of the motor 37 may have a roller bearing in the bracket or shield 38, in which the motor shaft 32 may run.

Figure VI shows a diagrammatic view of the assembly. The pump is shown at 21. Air enters the intake port 23, is compressed in the rotor chambers and goes out through the discharge port 24, through the pipe 24$^b$ to the oil separator 24$^c$ which contains baffle plates 24$^d$ with a multiplicity of perforations in alternate plates staggered with relation to corresponding holes in plates interleaved between them. The sealing fluid or oil strikes these plates clings to them and drains down into the pipe 27 and into the oil storage chamber 28 from whence it is driven into the chambers again via the pipe 28$^a$ into the oil port 25 by the air or gas pressure in the separator behind it. The air or gas passes through holes in the baffle plates out to atmosphere via the hand valve 24$^h$ which may be turned to obtain any desired pressure. A valve 24$^j$ may also limit the maximum flow of oil.

The check valves 26 (Fig. II) guided by plugs 26$^b$ in the cover plate are held closed by springs 26$^c$. Oil or air driven out of the rotor chambers when starting opens the valves. The valves will remain open discharging pressure as long as the pressure in the chambers is enough greater than the pressure of the gas in the discharge port. At high pressure this condition exists only while starting. Under normal operating conditions the pressure in the discharge port may be high and the valves remain closed.

The pinion may be mounted on a plain journal indicated in Figure II or on a roller bearing 35, running on the shaft 1 which may be hardened. The rollers may be confined, with a free running fit in the pinion behind the plate 36 which permits the roller bearing to be used without sacrificing any film area on the pinion. These hardened bearings preserve the eccentricity and prevent wear of the lobes after being run in.

It will be noted that when quiet, oil tends to collect in the intake port and is held in the oil port by pressure and by gravity. This oil assists in "priming" the pump when it is started. The pressure thus developed, in the absence of other pressure on the oil, causes the oil to flow into the oil port ready for business.

In this specification and in the claims I have made the statement or used the expression that the curves of envelopment upon or by which the contours of the rotors are formed are generated by the tooth form during "relative angular motions" inversely proportional to the numbers of teeth. I mean to indicate by this expression that altho the two peripheries travel at the same speed at the place where the teeth engage, they necessarily vary in relative angular displacement, moving as they do on different radii and one having one less tooth than the other. In the ratio of 8:9 for example, the larger rotor would not have completed its revolution by 40° when the smaller had made a complete turn. Necessarily this makes the teeth of one slide on the other; and it is one of the main objects of my invention to so form the curves of envelopment of the two sets of tooth divisions during the working range (which may be either using or delivering power) that the contours shall continuously maintain travelling contact due to the relative angular displacement specified; on the one hand not permitting any opening or relieving between the tooth divisions of the two rotors thru which anything approaching commercial pressures would be immediately dissipated; and on the other hand maintaining contact substantially as continuously and with substantially as slight friction as between plane surfaces, so that the teeth burnish one another as they engage and part, and can be efficiently lubricated to form a film which is not removed either by the contact of the metal or by fluid pressure. In practice after the teeth have become burnished no substantial lubrication between them is required for tightness.

Many variations may be made in my invention without departing from its spirit. Parts may be used along or in combination with one or more others. I claim all such novel features, shown or described, as lying within my invention, whether used singly or in various novel combinations.

What I claim is:—

1. In a rotary mechanism dealing with fluid pressures and having intake and outlet passageways and driving connections, two rotor members having tooth divisions forming between them chambers which open and close by relative rotation to perform pressure functions in connection with said passageways, one rotor within and eccentric to the other and having one less tooth division, contours on said tooth divisions providing said pressure functions and relative angular motion, said contours of each rotor conforming to curves of envelopment outlined by the successive positions of a tooth form of the other rotor during relative angular motions which motions are those of two circles tangent internally, each in turn carrying the appropriate tooth form, and the two circles having diameters proportional to the numbers of tooth divisions of the said rotors that are to conform thereto, the angular velocity of the outer circle bearing to that of the inner circle the inverse ratio of the numbers of tooth divisions of said rotors, said rotors having a continuous travelling pressure holding engagement between both ends of the passageways.

2. The combination claimed in claim 1, with said rotors having an opening phase from full mesh to open mesh, and a closing phase from open mesh to full mesh, a driving connection to one of said rotors providing continuously tight travelling contacts between said rotor contours during one of said phases, the other being driven by direct tooth engagement, and said tooth divisions adjusted in number to the size and contour system to provide driving tooth engagements substantially durable in character.

3. The combination claimed in claim 1, for gaseous fluids having means to supply a liquid mist to the rotor chambers for absorbing the heat of compression.

4. The combination claimed in claim 1, with the contours providing the pressure holding engagements having a sliding metal to metal, friction-free, polished contact relation.

5. The combination claimed in claim 1, with gas connections to said passageways and end walls for said rotors, a plurality of said rotor chambers enclosed at their ends between said passageways during rotation from one to the other and during changes in volume and pressure to provide a series of stages of pressure, said rotor chambers being enclosed by said end walls from the open mesh end of one passageway to the beginning of the other passageway, said rotor chambers so enclosed being separated from each other by said travelling pressure holding engagements to maintain said series of stages of pressure, and having the said driving connections applied to the outer rotor to maintain said pressure holding engagements in operative relation for tightness between said series of stages of pressure.

6. The combination claimed in claim 1, having gas connections to said passageways and having said passageways directly connected without substantial intervening clearance to said rotor chambers for the passage of gases from one passageway to the other to carry gases at high pressure from one passageway to the other in the full mesh region.

7. The combination claimed in claim 1, with gas connections to said passageways and end walls of said rotors, a plurality of said rotor chambers enclosed at their ends during changes in volume and pressure to provide a series of stages of pressure during rotation from one passageway to the other, said rotor chambers providing said series of stages of pressure being enclosed by the end walls from the open mesh end of one passageway to the beginning of the next passageway, said rotor chambers so enclosed being separated from each other by said travelling pressure holding engagements to maintain said series of stages of pressure, driving connections to the outer rotor to maintain said pressure holding engagements in tight relation between said rotor chambers containing said series of stages of pressure, and unloading means for said rotor chambers connected to the outlet passageway for easy starting.

8. The combination claimed in claim 1, with gas connections to said passageways and end walls of said rotors, a plurality of said rotor chambers enclosed at their ends between said passageways during rotation from one to the other and during changes in volume and pressure to provide a series of stages of pressure, and said rotor chambers being enclosed by said end walls from the open mesh end of one passageway to the beginning of the other passageway, said rotor chambers so enclosed being separated from each other by said travelling pressure holding engagements to maintain said series of stages of pressure, and having the said driving connections applied to the outer rotor to maintain said pressure holding engagements in operative relation for tightness between said series of stages of pressure, said driving connections comprising a driving shaft connected to center the outer rotor upon its axis.

9. The combination claimed in claim 1, having a source of liquid seal and connections and means for causing said seal liquid to enter said rotor mechanism, said means including a source of liquid supply subjected to pressure in one of said passageways and a liquid port in said rotor mechanism providing a restricted flow of liquid into said rotor mechanism.

10. The combination claimed in claim 1, with connections to said passageways for gases, an end wall engaging said rotors at one end having at least one of said passageways therein with its outer edge lying nearer the centers of said rotors than the outer portions of said rotor chambers, to conserve small pools of liquid in said rotor chambers during rotation.

11. The combination claimed in claim 1, with connections to said passageways for high and low pressure gases, one pressure connection for one passageway and one for the other, a source of liquid seal connected to said rotor mechanism and means to cause it to pass thru the same, and means for separating said liquid from gas connected from said high pressure passageway to said source of liquid seal.

12. The combination claimed in claim 1, having an end wall against one end of said rotors and enclosing rotor chambers at said end, having the said intake passageway and an entrance for liquid seal in the same end wall, and a source of liquid seal connected to said entrance.

13. The combination claimed in claim 1, having said driving connections consisting of a shaft centering and driving one of said rotors, and having two outboard bearings holding said shaft in alignment with the axes of said centered rotor, and a driving device for said shaft.

14. The combination claimed in claim 1, with the tooth form of the convex crowns of the teeth of one of said rotors being in substance the arc of a circle, and the other outlined contours conforming thereto.

15. The combination claimed in claim 1, having a casing with side walls fixed to hold pressures, one on one side of said rotors containing ports for said passageways, and one on the other side of said rotor movement, and a driving plate attached to one of said rotors enclosing said rotor chambers on the side opposite to the side wall having ports.

In testimony whereof I affix my signature.

MYRON F. HILL.